(12) United States Patent
Chen et al.

(10) Patent No.: US 8,504,563 B2
(45) Date of Patent: Aug. 6, 2013

(54) METHOD AND APPARATUS FOR SORTING INQUIRY RESULTS

(75) Inventors: Chao Chen, Hangzhou (CN); Xiaomei Han, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/262,611

(22) PCT Filed: Jul. 22, 2011

(86) PCT No.: PCT/US2011/045040
§ 371 (c)(1),
(2), (4) Date: Sep. 30, 2011

(87) PCT Pub. No.: WO2012/018559
PCT Pub. Date: Feb. 9, 2012

(65) Prior Publication Data
US 2013/0132356 A1  May 23, 2013

(30) Foreign Application Priority Data

Jul. 26, 2010 (CN) .......................... 2010 1 0239227

(51) Int. Cl.
*G06F 17/30* (2006.01)

(52) U.S. Cl.
USPC ........................ 707/728; 707/731; 707/750

(58) Field of Classification Search
None
See application file for complete search history.

(56) References Cited

U.S. PATENT DOCUMENTS

| | | |
|---|---|---|
| 6,434,550 B1 | 8/2002 | Warner et al. |
| 6,507,838 B1 | 1/2003 | Syeda-Mahmood |
| 2002/0123989 A1 | 9/2002 | Kopelman et al. |
| 2003/0046311 A1* | 3/2003 | Baidya et al. .................. 707/200 |
| 2004/0039735 A1* | 2/2004 | Ross et al. .......................... 707/3 |
| 2004/0122656 A1* | 6/2004 | Abir ...................................... 704/4 |
| 2005/0144094 A1* | 6/2005 | Floeder et al. .................. 705/27 |
| 2005/0234904 A1 | 10/2005 | Brill et al. |
| 2006/0069663 A1 | 3/2006 | Adar et al. |
| 2007/0067304 A1 | 3/2007 | Ives |
| 2008/0104049 A1 | 5/2008 | Richardson et al. |
| 2008/0201323 A1 | 8/2008 | Tuttle et al. |
| 2009/0006360 A1 | 1/2009 | Liao et al. |
| 2009/0138458 A1* | 5/2009 | Wanker ............................. 707/5 |
| 2009/0193007 A1 | 7/2009 | Mastalli et al. |
| 2009/0248657 A1 | 10/2009 | Chellapilla et al. |
| 2010/0070342 A1* | 3/2010 | Hu et al. ........................ 705/10 |
| 2010/0235354 A1 | 9/2010 | Gargaro et al. |
| 2010/0325131 A1 | 12/2010 | Dumais et al. |

OTHER PUBLICATIONS

"Supplier selection based on hierarchical potential support vector machine," by Guo et al. In: Expert Systems with Applications 36 (2009). Available at: ScienceDirect.*

"Predicting the Conversion Probability for Items on C2C Ecommerce Sites," by Wu & Bolivar. In: CIKM'09 (2009). Available at: ACM.*

"Optimizing Search Engines using Clickthrough Data," by Joachims, Thorsten. In: SIGKDD'02 (2002). Available at: ACM.*

(Continued)

*Primary Examiner* — Neveen Abel Jalil
*Assistant Examiner* — Daniel Kinsaul
(74) *Attorney, Agent, or Firm* — Lee & Hayes, PLLC (57) ABSTRACT

Sorting inquiry results includes, based on extracted inquiry results matching search conditions of a user, collecting features of the inquiry results. The collected features may be used as features of a respective inquiry result and feature fitting may be conducted based on a support vector machine (SVM) regression model to obtain a feature fitting value of the respective inquiry result. The inquiry results may be sorted based on relevancy values of the inquiry results, and, for inquiry results having a same relevancy level, the inquiry results may be sorted in a top-down manner based on feature fitting values of the inquiry results.

20 Claims, 7 Drawing Sheets

OTHER PUBLICATIONS

"Selective and Heterogeneous SVM Ensemble for Demand Forecasting," by Yue et al. In: 10th IEEE Int'l Conf. Computer and Information Technology (Jul. 1, 2010). Available at: IEEE.*

The PCT Search Report and Written Opinion mailed Dec. 7, 2011 for PCT application No. PCT/US11/45040, 7 pages.

* cited by examiner

PRODUCT TITLE

PRODUCT PICTURE   RECOMMEND UPLOADING ENLARGED PICTURES OF PRODUCT SO THAT
BUYER MAY INTUITIVELY KNOW PRODUCT DETAILS

UPLOAD PICTURE

RECOMMEND USING FREE TOOL "PICTURE ASSISTANT" THAT AUTOMATICALLY
PROCESSES PICTURE FORMAT AND SIZE AND UPLOADS!   USE NOW   HELP

DETAILED DESCRIPTION   PLEASE DESCRIBE IN ASPECTS OF PRODUCT PERFORMANCE, USAGE, PACKAGE,
AFTER-SALE SERVICE. RECOMMEND INSERTING PRODUCT DETAIL PICTURE IN
DETAILED DESCRIPTION

INSERT PICTURE   INSERT TABLE

TRANSACTION INFORMATION
--------------------------------------------------------------------------------

*WHETHER ONLINE ORDER SUPPORTED   ○ YES   ○ NO

UNIT   SETS   v

TOTAL SUPPLY   [   ]   SETS

PRICE RANGE   PLEASE HONESTLY FILL IN THE PRODUCT PRICE FOR THE CONVENIENCE
OF BUYER TO ORDER ONLINE

[   ] SETS~ [   ] SETS: [   ] DOLLARS/SET
[   ] SETS~ [   ] SETS: [   ] DOLLARS/SET      PRICE PREVIEW   Upon quantity
[   ] SETS~ [   ] SETS: [   ] DOLLARS/SET

FIG. 5

| | |
|---:|:---|
| *BRAND | PLEASE SELECT ⌄ |
| *MODEL NO. | |
| * NETWORK TYPE | PLEASE SELECT ⌄ |
| *SHAPE | PLEASE SELECT ⌄ |
| TIME TO MARKET | ________ YEAR |
| BRAND REGION | PLEASE SELECT ⌄ |
| CELL PHONE TYPE | PLEASE SELECT ⌄ |
| DATA BUSINESS | ☐ WIFI  ☐ GPS  ☐ BLUETOOTH  ☐ INFRA-RED RAY  ☐ OTHERS |
| SCREEN SIZE | ________ INCH |
| SCREEN COLOR | PLEASE SELECT ⌄ |
| MEMORY CARD | PLEASE SELECT ⌄ |
| PHONE MEMORY | PLEASE SELECT ⌄ |
| STANDBY TIME | ________ HOUR |
| COLOR | ________ |
| BATTERY CAOACITY | ________ MAH |
| OPERATION SYSTEM | PLEASE SELECT ⌄ |
| CAMERA PIXELS | PLEASE SELECT ⌄ |

METHOD AND APPARATUS FOR SORTING INQUIRY RESULTS

CROSS REFERENCE TO RELATED PATENT APPLICATIONS

This application is a national stage application of an international patent application PCT/US11/45040, filed Jul. 22, 2011, which claims priority from Chinese Patent Application No. 201010239227.3, filed on Jul. 26, 2010, entitled "METHOD AND DEVICE FOR SORTING INQUIRY RESULTS," which applications are hereby incorporated in their entirety by reference.

TECHNICAL FIELD

The present disclosure relates to the field of communication and computer technology and, more specifically, to a method and an apparatus for sorting inquiry results.

BACKGROUND

When a user conducts an information inquiry in an information inquiry search engine system, after the user inputs the inquiry conditions, the information inquiry system at the backend extracts the inquiry results matching the inquiry conditions, and presents the inquiry results which are sorted in a specific way to the user. The user may select the satisfactory information from the inquiry results which are presented and arranged in a certain order.

While sorting the inquiry results, the information inquiry system usually considers the timeliness of each inquiry result based on relevancy. In other words, the inquiry results are categorized into different relevancy levels based on their relevancy values, and then sorted in a top-down manner based on the relevancy levels. In the same relevancy level, the inquiry results are sorted based on the publishing time. The earlier the inquiry result is published, the higher its rank is.

Take the sorting of products in an information inquiry system of an e-commerce website as an example. After the information inquiry system extracts the product information matching the user's inquiry conditions from the database, it considers the timeliness of each product's information based on the ground of relevancy. Within the same relevancy level, the later the product's information is published, the higher its rank is.

However, some suppliers of the products re-publish the products' information repeatedly every day in order to make the ranking of their products' information higher under the current sorting techniques. Such massive repeated publication of information consume massive amounts of technical resources such as bandwidth, database, servers, etc. In addition, the publishing time oriented sorting induces malicious competition among suppliers and finally damages the user experience.

SUMMARY

The present disclosure introduces techniques for sorting inquiry results to save the resource consumption and improve the user experience.

By way of example and not limitation, the present disclosure provides the following technical solutions:

A method of sorting inquiry results of a search engine comprises, based on extracted inquiry results matching search conditions of a user, collecting one or any combination of factors. Such factors may include a quality factor indicating quality of a respective inquiry result, an active level factor indicating an active level of a supplier relating to the respective inquiry result, an industry factor indicating an industry of the supplier relating to the respective inquiry result, an information click conversion rate of the supplier relating to the respective inquiry result, and an information feedback conversion rate of the supplier relating to the respective inquiry result. Using collected contents as features of the respective inquiry results, the method further comprises conducting fitting of the features based on a support vector machine (SVM) regression model, and obtaining a feature fitting value of the respective inquiry result. The inquiry results may then be sorted based on a relevancy value of the inquiry results, and inquiry results in a same relevancy level may be sorted based on the feature fitting value in a top-down manner.

An apparatus for sorting inquiry results of a search engine comprises a first collection module that, based on extracted inquiry results matching search conditions of a user, collects one or in any combination of factors. The factors may include, for example, a quality factor indicating quality of a respective inquiry result, an active level factor indicating an active level of a supplier relating to the respective inquiry result, an industry factor indicating an industry of the supplier relating to the respective inquiry result, an information click conversion rate of the supplier relating to the respective inquiry result, and an information feedback conversion rate of the supplier relating to the respective inquiry result. A feature fitting module uses collected contents as features of the respective inquiry results, conducts fitting of the features based on a support vector machine (SVM) regression model, and obtains a feature fitting value of the respective inquiry result. A sorting module sorts the inquiry results based on a relevancy value of the inquiry results, and sorts the inquiry results in a same relevancy level based on the feature fitting value in a top-down manner.

According to the present disclosure, a timeliness consideration of the inquiry results may be weakened by using one or any combination of factors including a quality factor, an active level factor, an industry factor, an information click conversion rate, and/or an information feedback conversion rate as a basis for the sorting. Accordingly, the disclosed techniques herein may not only prevent consumption of the technical resources such as bandwidth, database, and servers, due to repeatedly publishing information by the suppliers, thereby saving resources consumption, but also avoid malicious competitions among suppliers, thereby improving users' experiences.

BRIEF DESCRIPTION OF THE DRAWINGS

In order to aid the understanding of the technical scheme of the example embodiments of the present disclosure or current techniques, accompanying figures are provided and briefly described below. The following figures represent only a few example embodiments instead of all embodiments of the present disclosure. It is apparent that one of ordinary skill in the art may, based on these accompanying figures, obtain other figures without making creative efforts.

DETAILED DESCRIPTION

The present disclosure, by reference to the Figures in the drawings, describes the example embodiments in details, to make the objectives, features and advantages of the present disclosure better understandable.

A First Example Embodiment

Figure 1:
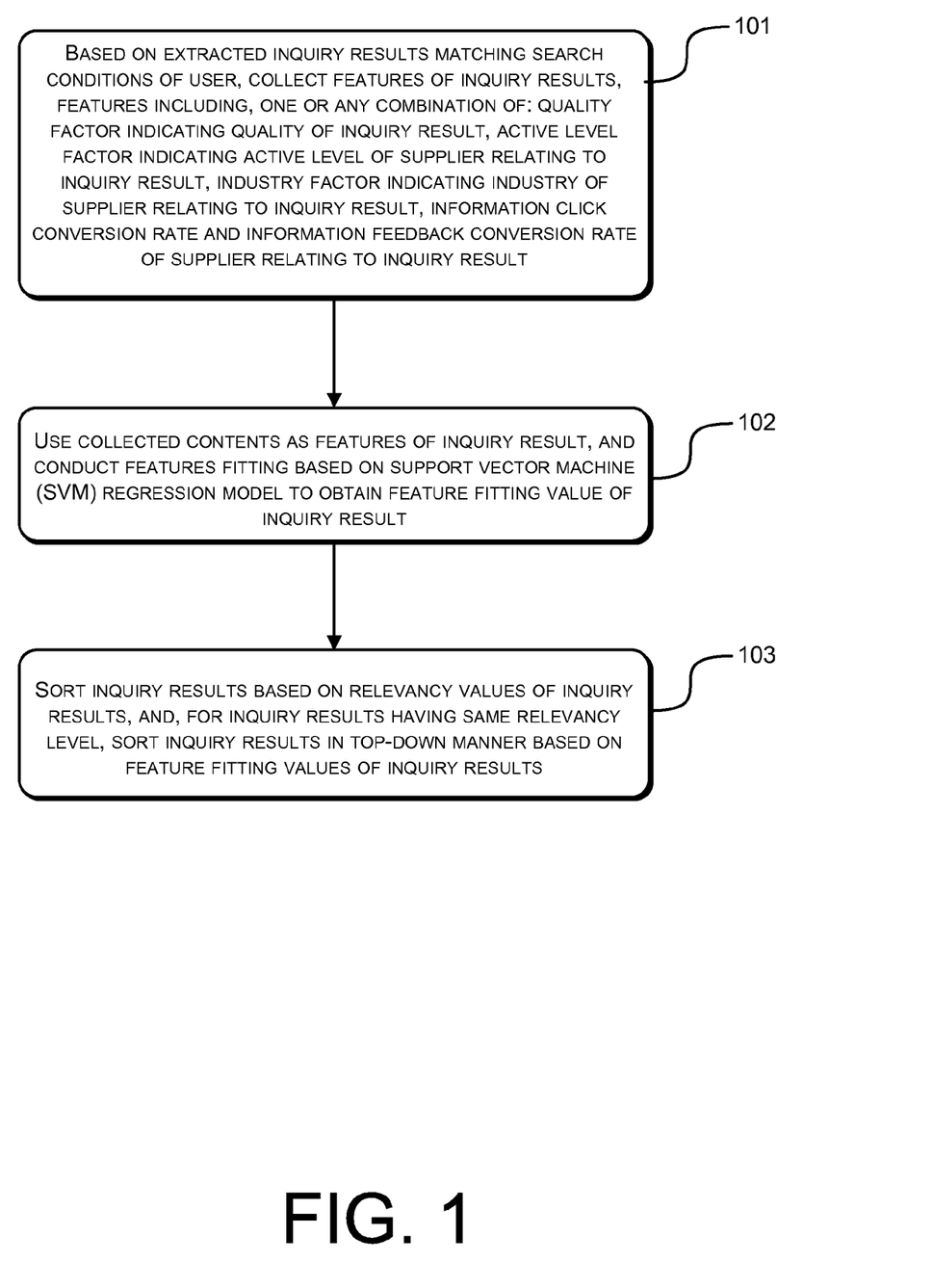
FIG. 1 is a flowchart of an example embodiment of a method for sorting inquiry results in accordance with the present disclosure.

FIG. 1 illustrates a flowchart of an example method for sorting inquiry results in accordance with the present disclosure. The method comprises operations represented by the following blocks.

At block 101, based on extracted inquiry results matching search conditions of a user, the method includes collecting features of the inquiry results. The features of the inquiry results include one or any combination of following items: a quality factor indicating quality of a respective inquiry result, an active level factor indicating an active level of a supplier relating to the respective inquiry result, an industry factor indicating an industry of the supplier relating to the respective inquiry result, an information click conversion rate and an information feedback conversion rate of the supplier relating to the respective inquiry result.

The quality factor indicating quality of the respective inquiry result may include one or more quality indicators of the respective inquiry result according to statistics of database information. The quality indicators of the respective inquiry result may comprise one or any combination of following indicators including a completion rate of information, a completion rate of attributes, and a completion rate of detailed description. A linear fitting to the one or more quality indicators of the respective inquiry results is then conducted to obtain the quality factor.

It should be noted that the present disclosure does not limit the quality indicators of the respective inquiry result to a single one of the completion rate of information, the completion rate of attributes, or the completion rate of detailed description. Rather, the completion rate of information, the completion rate of attributes, and the completion rate of detailed description all indicate the quality of the respective inquiry result in different aspects. Therefore, one or any combination of any of the rates may be used as the quality indicators for calculating the quality factor. Further, depending on the inquiry results, the quality indicators indicating the quality of the inquiry results may be other indicators other than the rates. When the content of the respective inquiry result is determined, the quality indicators indicating the inquiry results may also be determined. Accordingly, the corresponding quality indicator of the respective inquiry result may be calculated according to statistics of database information.

Take the quality indicators of the inquiry results including the completion rate of information, the completion rate of attributes and the completion rate of detailed description, for example. When the database information preserves fillable fields and filled field of the respective inquiry result, the statistics of the number of filled fields and the number of the fillable fields may be calculated, and the ratio of the number of the fillable fields and the number of filled fields may be the completion rate of information. When the database information preserves fillable attributes and filled attributes of the respective inquiry result, the statistics of the number of fillable attributes and the number of filled attributes may be calculated, and the ratio of the number of filled attributes and the number of fillable attributes may be the completion rate of attributes. When the database information preserves filled pictures and text description in the detailed description of the respective inquiry result, the respective inquiry result may be categorized as having a high completion rate of detailed description if both the picture and the text description are presented or the text description has more than 50 words, for example. The respective inquiry result may be categorized as having a medium completion rate of detailed description if its text description has 20-50 words, for example. The inquiry result may be categorized as having a low completion rate of detailed description if its text description has less than 20 words, for example. The high, medium and low completion rates of detailed description correspond to certain examples of pre-set values.

However, the present disclosure is not intended to limit the conditions of the high, medium, and low completion rates to those listed. Instead, they can be set according to the user's requirements. For example, when the user has a high requirement for the completion rate of detailed description of certain inquiry result, the inquiry results whose text description has more than 60 words may be categorized as having the high completion rate of detailed description. Also for example, when the user has a low requirement for the completion rate of detailed description of certain inquiry result, the inquiry results whose text description has more than 40 words may be considered as having a high completion rate of detailed description.

After the completion rate of information, the completion rate of attributes and the completion rate of detailed description are calculated by statistics, and the quality factor of each inquiry result may be obtained by conducting a linear fitting to the completion rate of information, the completion rate of attributes and the completion rate of detailed description. For example, the quality factor=the completion rate of information*0.3+the completion rate of attributes*0.4+the completion rate of detailed description*0.3. It should be noted that the present disclosure is not intended to limit the weight of each quality indicator of the inquiry result for conducting the linear fitting. Rather, the weights of the quality indicators of each inquiry result may be adjusted according to different applications.

The collected active level factor indicating the active level of the supplier relating to the respective inquiry result may comprise one or more active level indicators of the supplier according to statistics of database information. The active level indictors of the supplier relating to the inquiry result may include online time of the supplier relating to the inquiry result and/or an active grade of the supplier relating to the inquiry result. The linear fitting to the active level indicators of the supplier relating to the inquiry result obtained by statistics may be conducted to obtain the active level factor.

It should be noted that in the present disclosure, the active level indicators of the supplier relating to the inquiry result are not limited to the online time of the supplier relating to the respective inquiry result and/or the active grade of the supplier relating to the respective inquiry result. For example, the online time of the supplier relating to the respective inquiry result and the active grade of the supplier relating to the respective inquiry result both indicate the active level of the supplier relating to the respective inquiry result in different aspects. Therefore, the online time of the supplier relating to the respective inquiry result and/or the active grade of the supplier relating to the respective inquiry result may be used as the active level indicator(s) for calculating the active level factor. With different inquiry results, the active level indicators indicting the active level factor may include indicators other than the aforementioned indicators. It should be noted that, when the contents of the respective inquiry result are determined, the active level indicator of the supplier relating to the respective inquiry result is also determined accordingly. Therefore, the corresponding active level indicators of the supplier relating to the respective inquiry result may be calculated according to statistics of database information.

Take the active level indicators of the supplier relating to the respective inquiry result, which are the online time of the supplier relating to the respective inquiry result and the active grade of the supplier of the respective inquiry result, for example. When the database preserves the online time of the supplier relating to the respective inquiry result and the active grade of the supplier relating to the respective inquiry result, the statistics of the online time of the supplier relating to the respective inquiry result and the active grade of the supplier relating to the respective inquiry result during a period of time can be calculated. The active level factor of each inquiry result is obtained by conducting a linear fitting to the statistics of the online time of the supplier relating to the respective inquiry result and the active grade of the supplier relating to the inquiry result. For example, the active level factor=the online time of the supplier relating to the respective inquiry result*0.5+the active grade of the supplier relating to the respective inquiry result*0.5. It should be noted that the present disclosure is not intended to limit the weights of the active level indicators of the supplier relating to the respective inquiry result for conducting the linear fitting. Rather, the weights of the active level indicators of the supplier relating to the respective inquiry result may be adjusted according to different applications.

The industry factor describes an industry of the supplier relating to the respective inquiry result. The function of the industry factor is to calculate the respective supplier's expected feedbacks. For example, the data flow of consuming industry websites is much higher than that for manufacturing industry websites. Thus it is reasonable to reflect the industry difference when estimating the feedbacks. With the consideration of the industry factor, the expected feedbacks may be tied to data flow of the websites. The suppliers in the consuming industry are expected to have high estimated feedbacks while the suppliers in the manufacturing industry are expected to have relatively low estimated feedbacks. In some implementations, the industry factor is irrelevant to the inquiry.

The collected information click conversion rate (sometimes referred to as the "click feedback rate") of the supplier relating to the respective inquiry result may comprise calculating a number of times the information being exposed and a number of times the information being clicked in a period of time according to statistics of information of a user log; and obtaining a ratio of the number of times the information being exposed and the number of times the information being clicked as the information click conversion rate of the supplier.

The collected feedback conversion rate (or click feedback rate) of information of the supplier relating to the respective inquiry result may comprise calculating a number of times the information is clicked and a number of times feedback is received relating to the information in a period of time according to statistics of information of the user log. The collected feedback conversion rate (or click feedback rate) of information of the supplier relating to the respective inquiry result may further comprise obtaining a ratio of the number of times feedback relating to the information has been received and the number of times the information has been clicked according to statistics as the information feedback conversion rate of the supplier relating to the inquiry result.

For example, the database preserves the data of the information being exposed, the data of the clicked information, and the data of the feedback of the information of the supplier relating to respective inquiry result. Such data may also include a respective context in which the information was exposed, the information was clicked, and/or the feedback of the information of the supplier relating to respective inquiry result was received. The exposure of the information indicates the publication of the information. Each time when the information is published, the information is exposed once. The feedback of the information indicates the communication between the user and the supplier, such as via online chatting, etc., after the exposed information is clicked. Statistics of the number of times the information has been exposed, the number of times the information has been clicked, and the number of times feedback has been received relating to the information in a period of time may be calculated. A ratio of the number of times of the information has been clicked and the number of times of the information has been exposed is calculated as the information click conversion rate of the supplier relating to the respective inquiry result. Also, a ratio of the number of times feedback has been received relating to the information and the number of times the information has been clicked according to statistics is calculated in order to obtain the feedback conversion rate of information of the supplier relating the inquiry result.

At block 102, the method further comprises using the collected contents as features of the respective inquiry result, and conducting features fitting based on a support vector machine (SVM) regression model to obtain a feature fitting value of the respective inquiry result.

The SVM regression model transforms a linear non-separable problem at a low-dimensional space to a linear separable problem at a high-dimensional space. The main ideas of SVM may be summarized as follows:

(1) For a linear non-separable situation, a nonlinear mapping algorithm is used to transform a linear non-separable sample from a low-dimensional space to a high-dimensional feature space so as to make it linear separable, and further to make it possible to use a linear algorithm to conduct linear analysis of the nonlinear features of the sample at the high-dimensional feature space.

(2) It builds the optimal separate hyperplane in a feature space based on structural risk minimization theory so as to optimize the overall learning effects and to satisfy an upper bound of the expected risk in the whole sample space based on a probability.

At the phase of the model learning, the dimension of the feature space may be enhanced by using the kernel function. The kernel function may select the radial base function (RBF) and the SVM may adopt the support vector regression model (NU_SVR) to obtain continuous prediction values to meet the application requirements.

The process to build the SVM model is described in detail below by using the quality factor, the active level factor, the information click conversion rate and the information feedback conversion rate as the features of the respective inquiry result as the example.

First, a certain amount of extracted supplier samples are labeled as shown in the Table below. The quality factor is a continuous value between 0 and 1, and 0 indicates the worst while 1 indicates the best. The active level factor is a continuous value between 0 and 1, and 0 indicates the worst while 1 indicates the best. The information click conversion rate is a continuous value between 0 and 1, and 0 indicates the worst while 1 indicates the best. The information feedback conversion rate is a continuous value between 0 and 1, and 0 indicates the worst while 1 indicates the best. The label conclusion is a discrete value (0 or 1), and 0 indicates bad while 1 indicates good.

| Supplier | Quality factor | Active level factor | Information click conversion rate | Information feedback conversion rate | Label conclusion |
|---|---|---|---|---|---|
| A | 1 | 1 | 1 | 1 | 1 |
| B | 0.9 | 0.6 | 0.8 | 0.6 | 1 |
| C | 0.5 | 0.4 | 0.6 | 0.4 | 1 |
| D | 0.2 | 0.7 | 0.2 | 0.1 | 0 |
| E | 0.4 | 0.8 | 0.4 | 0.2 | 0 |
| F | 0 | 0 | 0 | 0 | 0 |

The training model is then obtained by using the labeled data as input and invoking the SVM interface for training. The model can be used for feature prediction in the future. In other words, whenever the quality factor, the active level factor, the information click conversion rate and the information feedback conversion rate are collected, the four factors may be inputted to obtain the feature fitting value of the respective inquiry result.

However, if the collected factors are other factors or a combination of any other factors, the aforementioned method may still be used to build a corresponding SVM regression model and to conduct the feature fitting based on the SVM regression model to obtain the feature fitting value of the respective inquiry result.

At block 103, the method further comprises sorting the inquiry results based on relevancy values of the inquiry results, and, for inquiry results having a same relevancy level, substantially similar relevancy levels, or relevancy levels within a range, sorting the inquiry results in a top-down manner based on the feature fitting values of the inquiry results. Whether the relevancy levels of the inquiry results are substantially similar or within a range may be determined by comparison to a threshold.

First, the sorting is conducted based on the relevancy values of the inquiry results. In other words, similar to the current techniques, the inquiry results are firstly categorized into different relevancy levels, and then are sorted based on the relevancy levels in a top-down manner. In the same relevancy level, different from the current techniques, the inquiry results are sorted in a top-down manner based on the feature fitting values of the inquiry results. In this example, an inquiry result having a higher feature fitting value is listed before an inquiry result having a lower feature fitting value.

According to the above embodiment, the timeliness factor of the inquiry results can be weakened by using one or any combination of the quality factor, the active level factor, the industry factor, the information click conversion rate and the information feedback conversion rate for sorting. Accordingly, the disclosed techniques herein may not only prevent consumption of the technical resources such as bandwidth, database, and servers, due to repeatedly publishing information by the suppliers, thereby saving resources consumption, but also avoid malicious competition among suppliers, thereby improving users' experiences.

A Second Example Embodiment

Figure 2:
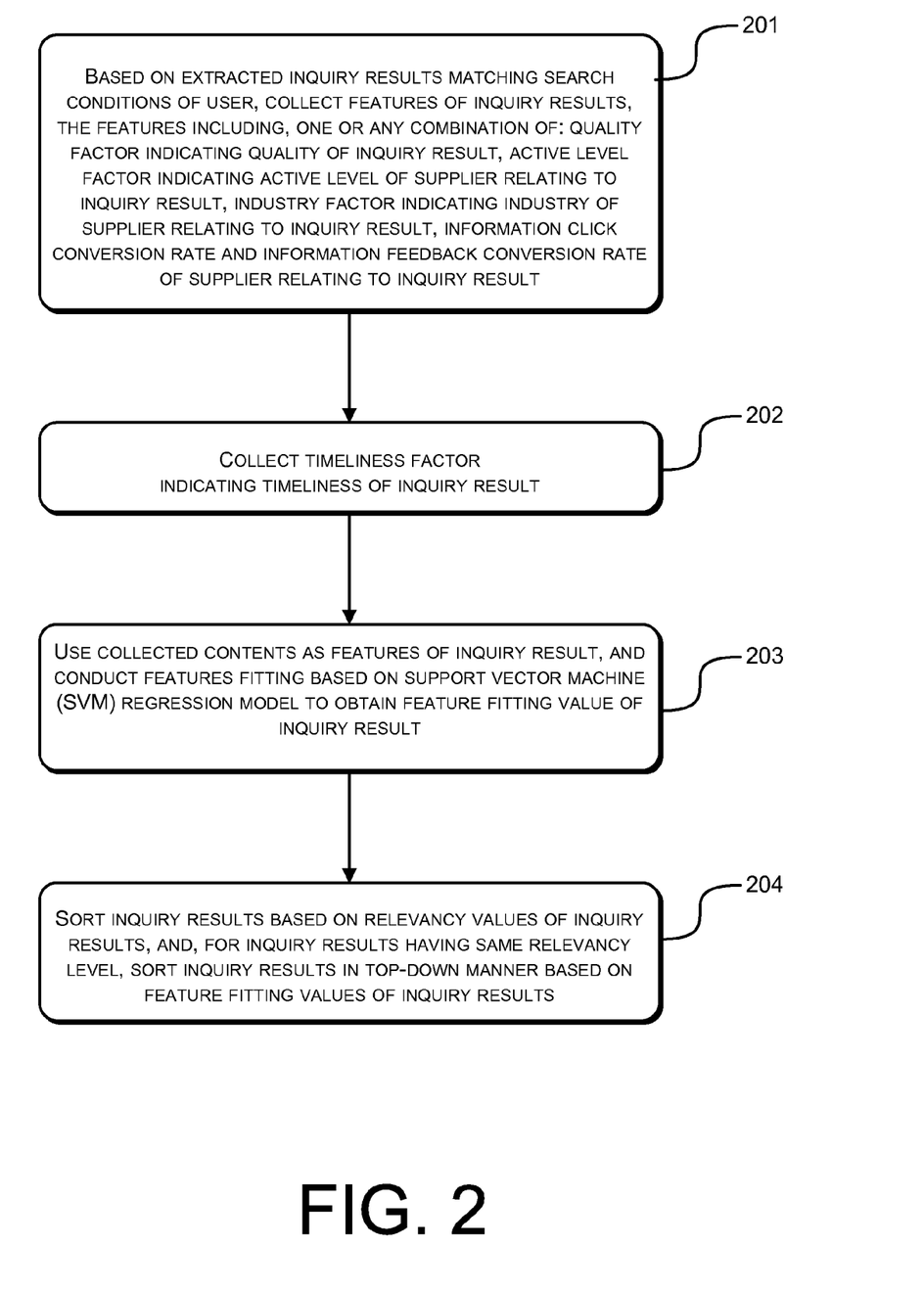
FIG. 2 is a flowchart of another example embodiment of the method for sorting inquiry results in accordance with the present disclosure.

Different from the first example embodiment, in addition to using one or any combination of the quality factor, the active level factor, the information click conversion rate, the information feedback conversion rate, and the industry factor as the features to conduct feature fitting, the second example embodiment also uses a timeliness factor as a feature for the feature fitting. FIG. 2 illustrates a flowchart of an example method for sorting inquiry results in accordance with another embodiment of the present disclosure. The method comprises operations represented by the following blocks.

At block 201, based on extracted inquiry results matching search conditions of the user, the method comprises collecting, one or any combination, the quality factor indicating quality of the respective inquiry result, the active level factor indicating the active level of the supplier relating to the respective inquiry result, the industry factor indicating an industry relating to the respective inquiry result, the information click conversion rate of the supplier relating to the inquiry results, and the information feedback conversion rate of the supplier relating to the inquiry results.

As the process of collecting the quality factor indicating quality of the respective inquiry result, the active level factor indicating the active level of the supplier relating to the respective inquiry result, the industry factor indicating an industry relating to the respective inquiry result, the information click conversion rate of the supplier relating to the inquiry results, and the information feedback conversion rate of the supplier relating to the inquiry results is already described in detail in the previous embodiment, no further description in this aspect is given for brevity.

At block 202, the method further comprises collecting the timing factor indicating a timeliness of the respective inquiry result. The timing factor may be a publishing time of the respective inquiry result. It should be noted that the present embodiment is not intended to limit the order of operations corresponding to blocks 201 and 202. Rather, the operation of block 202 may be performed prior to the operation of block 201, or they may be performed concurrently.

At block 203, the method further comprises using collected contents as one or more features of the respective inquiry result, conducting features fitting of the one or more features based on the SVM regression model, and obtaining the feature fitting value of the inquiry results. The relevant process may be referenced to the previous embodiment and is not described in detail for brevity.

At block 204, the method further comprises sorting based on the relevancy values of the inquiry results, and sorting in a top-down manner based on the feature fitting value for inquiry results having a same relevancy level. Details of the operations of block 204 may be had be referring to the previous embodiment and are therefore omitted here for the sake of brevity.

According to the above embodiment, the timeliness factor of the inquiry results is considered on the ground of one or any combination of the quality factor, the active level factor, the industry factor, the information click conversion rate and the information feedback conversion rate. On one hand, it weakens the timeliness factor of the respective inquiry result to a certain extent. On the other hand, the publishing time of the information often determines the effectiveness of the information, however. To use the publishing time of information as a dimension of the information quality may further enhance the effectiveness of the inquiry results in the information inquiry system.

A Third Example Embodiment

Figure 3:
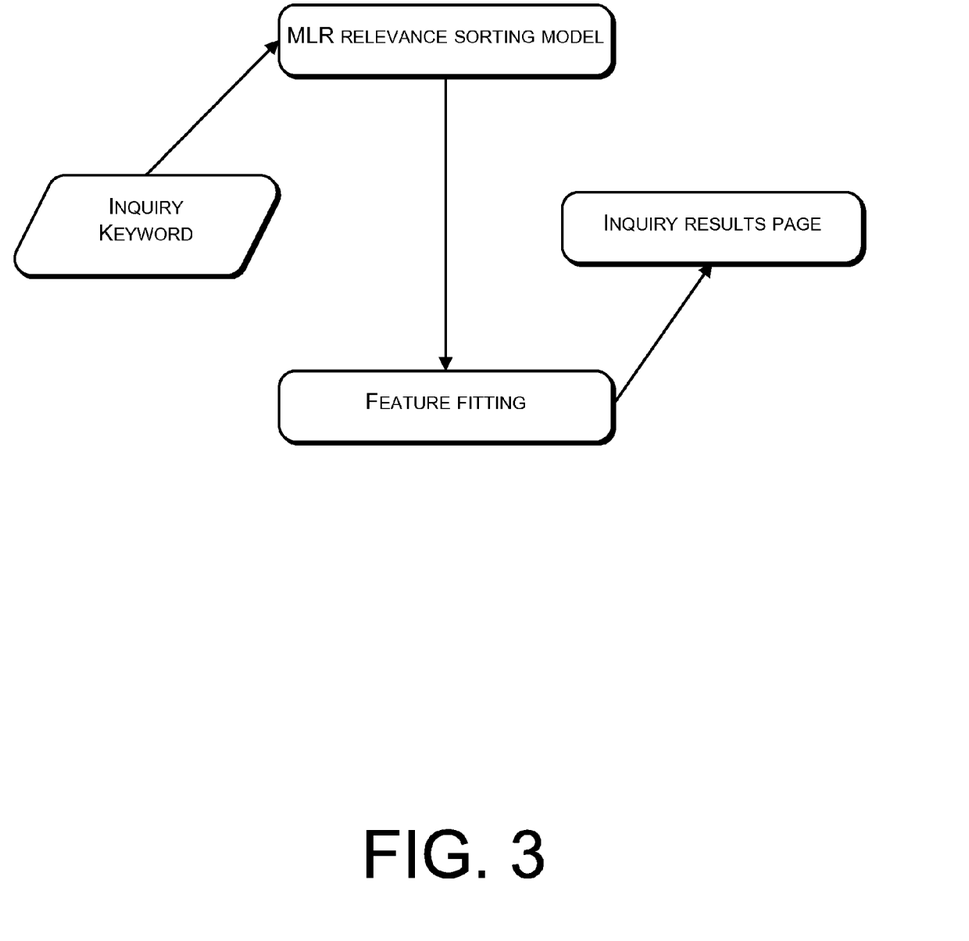
FIG. 3 is a diagram of a structure of an example information inquiry system in accordance with the present disclosure.
Figure 4:
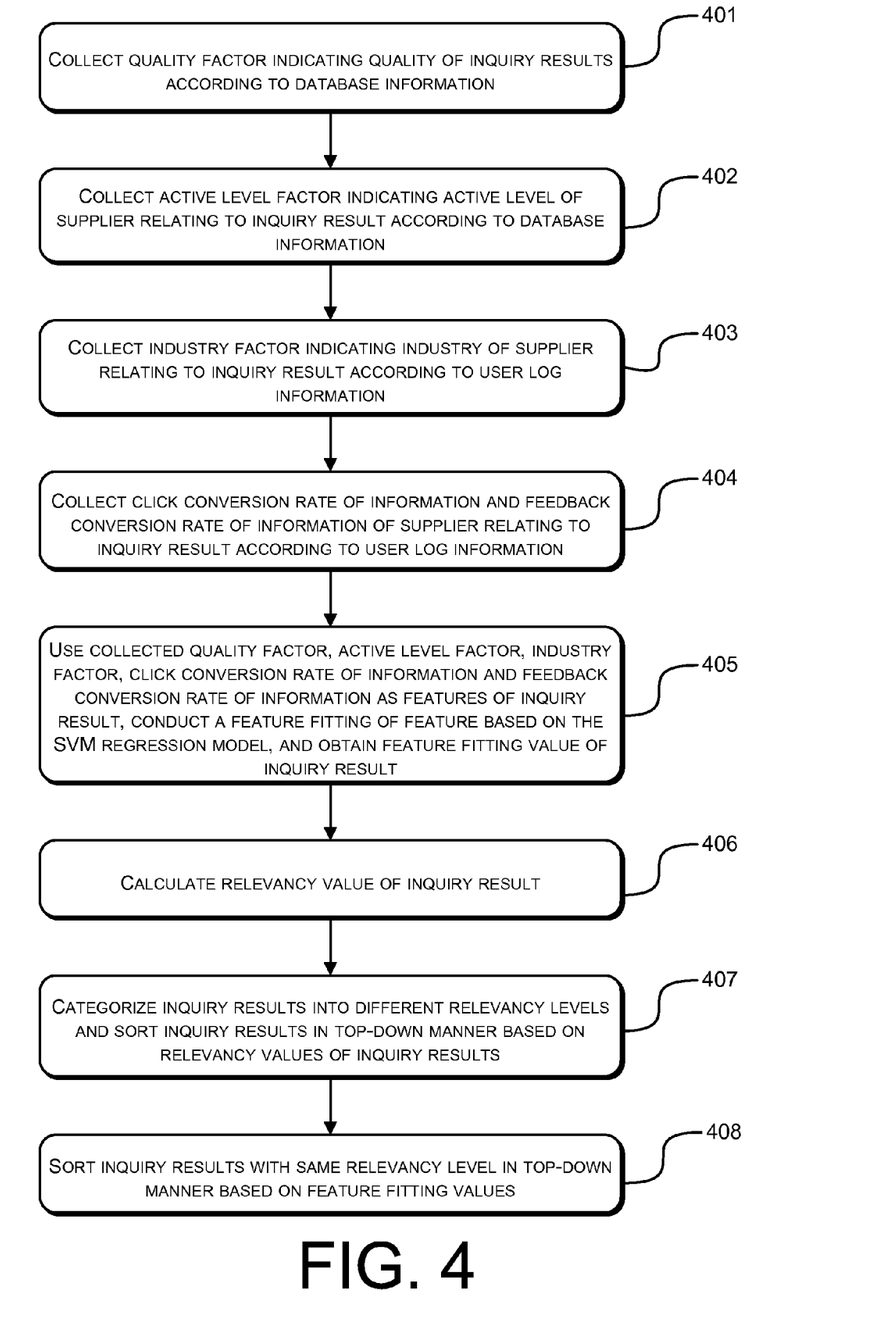
FIG. 4 is a flowchart of another example embodiment of the method for sorting inquiry results in accordance with the present disclosure.

FIG. 3 illustrates a diagram of a structure of an example information inquiry system in accordance with one embodiment of the present disclosure. As shown in FIG. 3, after the user inputs the inquiry keywords to the information inquiry system, the information inquiry system extracts the inquiry results matching the inquiry keywords from the database, sorts the inquiry results based on the MLR relevance sorting model, sorts inquiry results with the same relevancy level according to the feature fitting values, and finally presents the sorted inquiry results to the user. The method for sorting the inquiry results by the information inquiry system as described in FIG. 3 is described in details below based on the feature fitting of the quality factor, the active level factor, the industry factor, the information click conversion rate, and the information feedback conversion rate. FIG. 4 illustrates a flowchart of an example method for sorting inquiry results in accordance with another embodiment of the present disclosure. The method comprises operations represented by the following blocks.

At block 401, the method comprises collecting the quality factor indicating quality of a respective inquiry result according to the database information.

Figure 5:
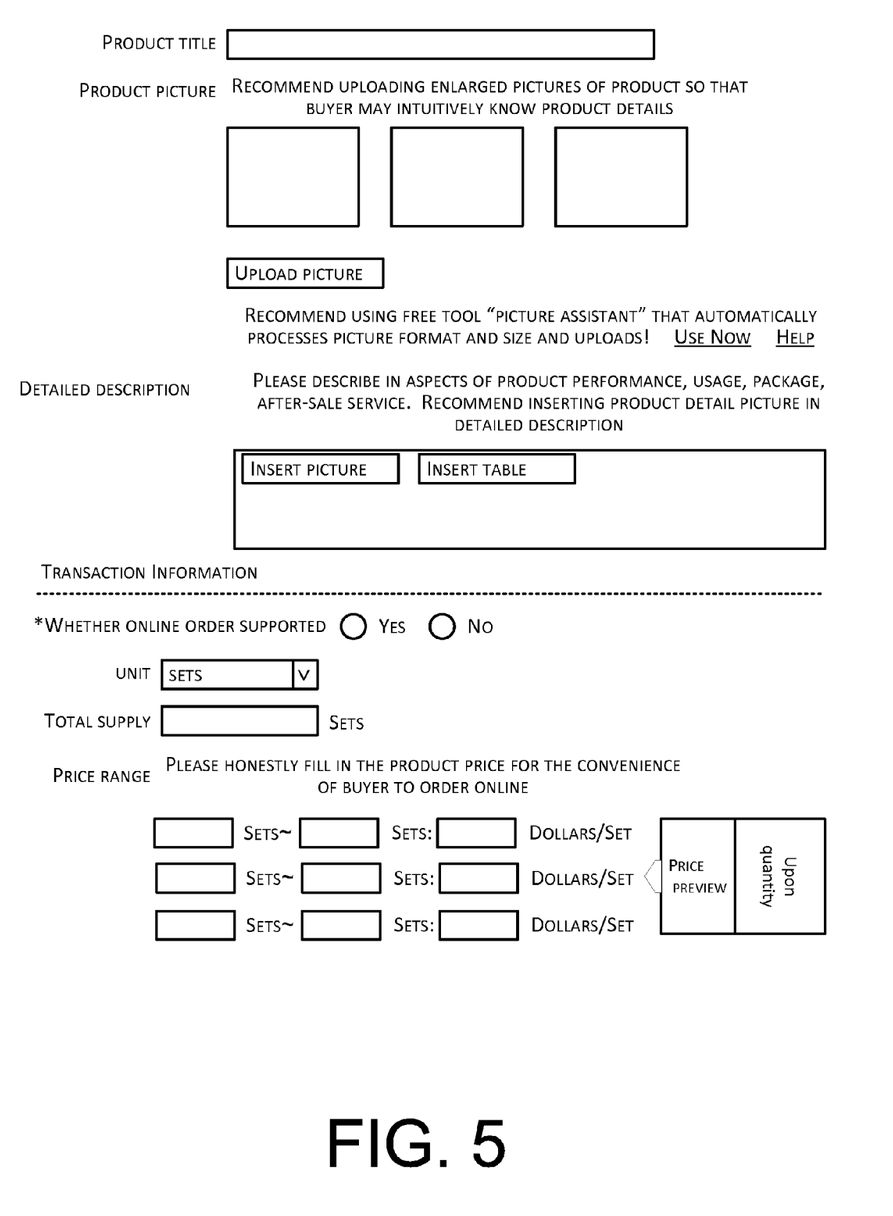
FIG. 5 is an example diagram of presenting fields of information of a product.
Figure 6:
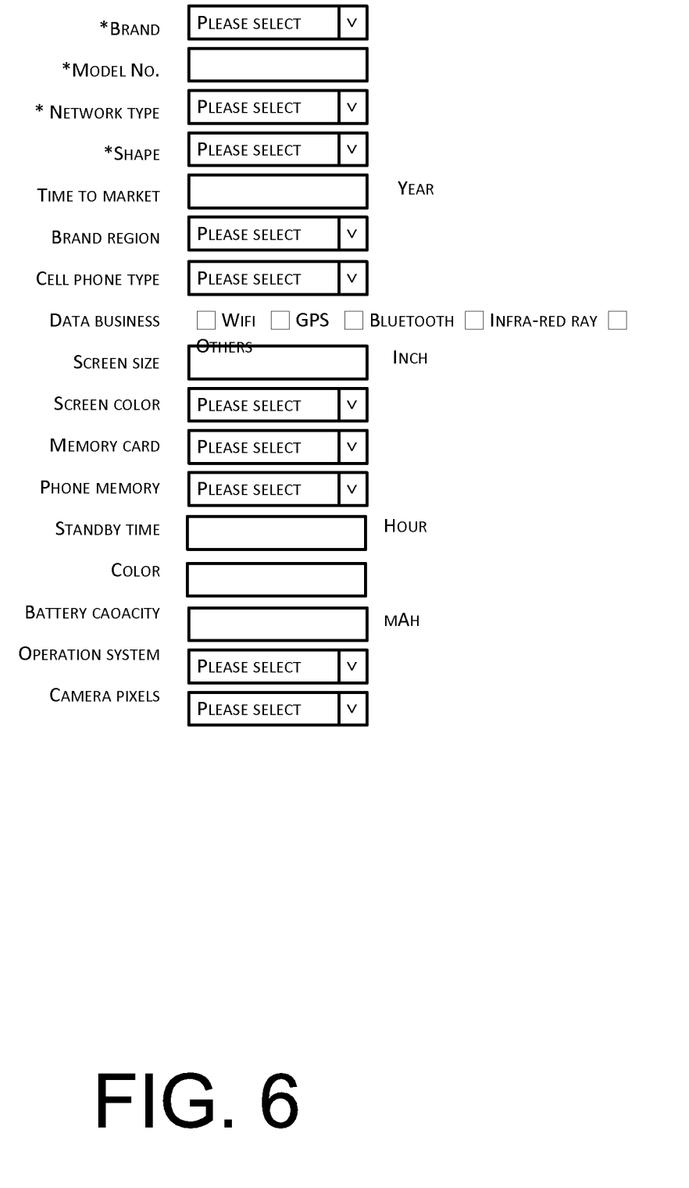
FIG. 6 is an example diagram of presenting the attributes of information of a mobile phone.

The quality indictor of the inquiry results need to be calculated according to the database information. The quality indictor of the inquiry results comprises, one or any combination of, the completion rate of information, the completion rate of attributes and the completion rate of detailed description. The completion rate of information is the ratio of the number of the filled fields and the number of the fillable fields. For example, for the information of a product, the field means the regions to fill the information. FIG. 5 illustrate a diagram that presents the fields of the information of a product. The fields of the information of the product shown in FIG. 5 include: "Product Title", "Product Picture", "Detailed Description", "Attributes", "Whether Online Order Supported", "Unit", "Total Supply", "Price Range." The fields of the information may further include "Mix-shipping", "Shipping Cost", "Information Effective Period," and etc., which are not shown in FIG. 5. The completion rate of attributes is a ratio of the number of the filled attributes and the number of the fillable attributes. The attribute mean the dimension of description of the product. Take the information of a mobile phone as the example. FIG. 6 illustrates an example diagram that presents the attributes of information of mobile phones. With respect to the completion rate of detailed description, the product information is categorized as having a high completion rate of detailed description if its pictures and the text description are both presented or its text description has more than 50 words; categorized as having a medium completion rate of detailed description if its text description has 20-50 words; and categorized as having a low completion rate of detailed description if its text description has less than 20 words. The high, medium and low completion rates of detailed description may correspond to certain pre-set values respectively.

After the one or more quality indicators of the inquiry results are obtained according to the statistics, the quality factor may be obtained by conducting the linear fitting of the quality indicator.

At block 402, the method further comprises collecting the active level factor indicating the active level of the supplier relating to the respective inquiry result according to the database information.

The one or more active level indictors of the supplier relating to the inquiry result need to be calculated according to statistics of the database information. The active level indictors of the supplier relating to the inquiry result may include the online time of the supplier relating to the respective inquiry result and/or the active grade of the supplier relating to the respective inquiry result. The active level factor may be obtained by conducting a linear fitting of the active level indicators of supplier relating to the inquiry result.

At block 403, the method comprises collecting the industry factor indicating the industry of the supplier relating to the respective inquiry result according to the user log information.

At block 404, the method comprises collecting the information click conversion rate and the information feedback conversion rate of the supplier relating to the respective inquiry result according to the user log information.

At block 405, the comprises using the collected quality factor, the active level factor, the industry factor, the information click conversion rate and the information feedback conversion rate as features of the respective inquiry result, conducting a feature fitting of the feature based on the SVM regression model, and obtaining the feature fitting value of the respective inquiry result.

At block 406, the method comprises calculating the relevance value of the respective inquiry result.

The calculation process of the relevance value takes into consideration of the degree of matching between the inquiry keywords inputted by the user and the title of information, as well as the correctness of the user's selection of one or more categories to publish the information.

In addition, the present disclosure does not limit the implantation of the operation of block 406. Rather, the operation of block 406 may be concurrently conducted with other collecting operations, or be completed before the collection of factors.

At block 407, the method comprises categorizing the inquiry results into different relevancy levels and sorting the inquiry results in a top-down manner based on the relevancy values of the inquiry results.

At block 408, the method further comprises sorting inquiry results with the same relevancy level in a top-down manner based on the feature fitting values of such inquiry results.

According to the present disclosure, the timeliness consideration of the inquiry results is weakened by using, one or in any combination of, the quality factor, the active level factor, the industry factor, the information click conversion rate, and the information feedback conversion rate as an orientation for sorting. Accordingly, the disclosed techniques herein may not only prevent consumption of the technical resources such as bandwidth, database, and servers, due to repeatedly publishing information by the suppliers, thereby saving resources consumption, but also avoid the malicious competitions among supplier, thereby improving the user's experiences.

A Fourth Example Embodiment

Figure 7:
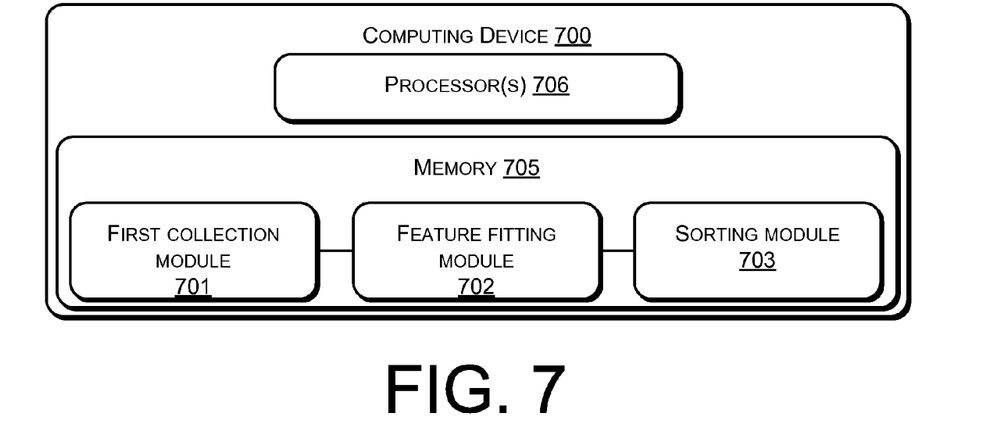
FIG. 7 is a diagram of a structure of an example apparatus for sorting inquiry results in accordance with the present disclosure.

Corresponding to the method for sorting inquiry results as discussed above, the present disclosure also provides an apparatus for sorting inquiry results. FIG. 7 illustrates an example diagram of a structure of an apparatus or a computing device for sorting inquiry results in accordance with an embodiment of the present disclosure.

In one embodiment, the computing device 700 may include, but is not limited to, one or more processors 706 and memory 705. The memory 705 may store therein one or more program modules and/or program data. In one embodiment, the program modules may include a first collection module 701, a feature fitting module 702, and a sorting module 703. The internal structures of the apparatus and their connections are described as below in conjunction with its principles of operations of the apparatus.

The first collection module 701, based on extracted inquiry results matching search conditions of the user, collect, one or any combination of following factors: the quality factor indicating quality of the respective inquiry result, the active level factor indicating the active level of the supplier relating to the inquiry results, the industry factor indicating the industry of the supplier relating to the respective inquiry result, the information click conversion rate of the supplier relating to the respective inquiry result, and the information feedback conversion rate of the supplier relating to the respective inquiry result.

The feature fitting module 702 uses the collected factors as one or more features of the respective inquiry result, conducts feature fitting based on the SVM regression model, and obtains the feature fitting value of the respective inquiry result.

The sorting module 703 sorts the inquiry results based on the relevancy values of the inquiry results, and sorts inquiry results with same relevancy level in a top-down manner based on their feature fitting values.

The memory 705 may include computer-readable media in the form of volatile memory, such as random-access memory (RAM) and/or non-volatile memory, such as read only memory (ROM) or flash RAM. The memory 705 is one example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Figure 8:
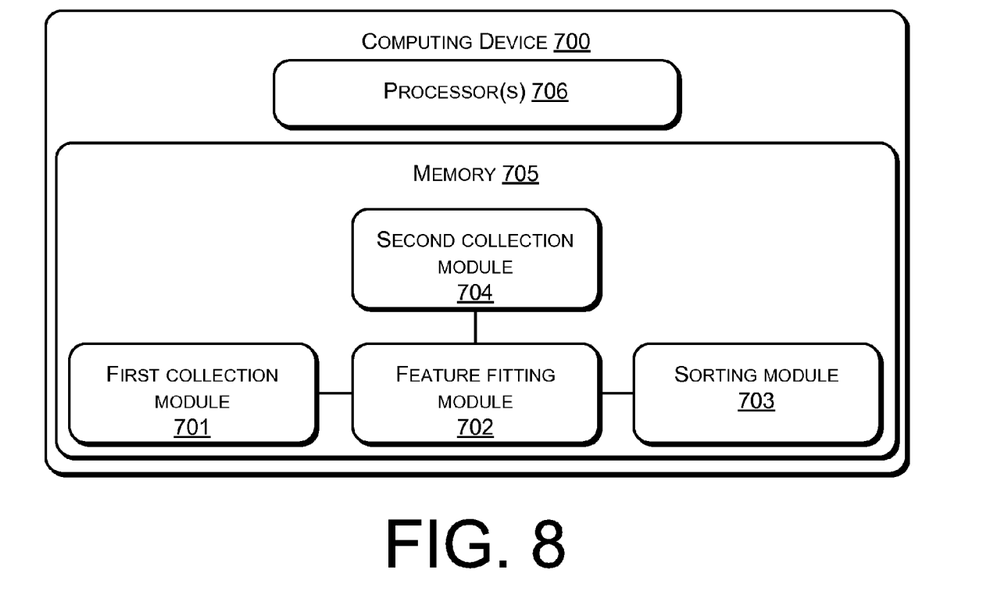
FIG. 8 is a diagram of a structure of another example apparatus for sorting inquiry results in accordance with another embodiment of the present disclosure.

FIG. 8 illustrates an example diagram of a structure of an apparatus or a computing device for sorting inquiry results in accordance with another embodiment of the present disclosure. The memory 705 in the FIG. 8 may further comprise a second collection module 704 that collects the timeliness factor indicating the timeliness of the respective inquiry results after collecting, one or any combination of, the quality factor indicating quality of the respective inquiry result, the active level factor indicating the active level of the supplier relating to the inquiry results, the industry factor indicating the industry of the supplier relating to the respective inquiry result, the information click conversion rate of the supplier relating to the respective inquiry result, and the information feedback conversion rate of the supplier relating to the respective inquiry result.

According to the above embodiment, the timeliness factor of the inquiry results is considered based on, one or any combination of, the quality factor, the active level factor, the industry factor, the information click conversion rate and the information feedback conversion rate. It weakens the timeliness factor of the respective inquiry result to a certain extent. The publishing time of the information often determines the effectiveness of the information, however. To use the publishing time of information as a dimension of the information quality may further enhance the effectiveness of the inquiry results in the information inquiry system.

It should be noted that one of ordinary skill in the art can clearly understand that all or part of the processes of the aforementioned embodiments in the present disclosure may be implemented by using computer-executable instruction to instruct one or more relevant hardware devices. The computer-executable instructions may be stored in one or more computer-accessible storage media. Computer-accessible storage media is an example of computer-readable media. The computer-executable instructions, when executed by one or more processors, may implement the processes described in the methods of the aforementioned embodiments. Such computer-accessible storage media may include a hard disk, an optical disk, Read-Only Memory (ROM), or Random Access Memory (RAM), and etc.

The present disclosure gives detailed description of the method and the apparatus of sorting inquiry results in a search engine, and illustrates the principles and the implementations by presenting certain embodiments. The embodiments are merely for illustrating the present disclosure and are not intended to limit the scope of the present disclosure. It should be understood for persons in this technical field that certain modifications and improvements can be made and should be considered under the protection of the present disclosure without departing from the principles of the present disclosure.

What is claimed is:

1. A method of sorting inquiry results in a search engine, performed by one or more processors configured with computer readable instructions, the method comprising:

based on extracted inquiry results matching search conditions of a user, collecting one or more features of a respective inquiry result, the one or more features of the inquiry results including at least a quality factor indicating a quality of the respective inquiry result and one or any combination of the following factors: an active level factor indicating an active level of a supplier relating to the respective inquiry result, an industry factor indicating an industry of the supplier relating to the respective inquiry result, an information click conversion rate and an information feedback conversion rate of the supplier relating to the respective inquiry result, the collecting the quality factor including:

obtaining one or more quality indicators of the respective inquiry result according to statistics of information of a database, the one or more quality indicators including one or any combination of: a completion rate of information including a ratio of a number of filled fields to a number of fillable fields of the respective inquiry result, a completion rate of attributes including a ratio of a number of filled attributes to a number of fillable attributes of the respective inquiry result, and a completion rate of detailed description including a pre-set value based on a number of words included in a description of the respective inquiry result; and conducting a linear fitting of the one or more quality indicators to obtain the quality factor;

using collected factors as the one or more features of the respective inquiry result and conducting feature fitting based on a support vector machine (SVM) regression model to obtain a feature fitting value of the respective inquiry result; and sorting the inquiry results based on relevancy values of the inquiry results, and, for inquiry results having a same or similar relevancy values, sorting the inquiry results in a top-down manner based on feature fitting values of the inquiry results.

2. The method as recited in claim 1, wherein the following factors further include a timeliness factor indicating a timeliness of the respective inquiry result.

3. The method as recited in claim 1, wherein the collecting the active level factor comprises:

obtaining one or more active level indicators of the supplier relating to the respective inquiry result, the one or more active level indicators including one or any combination of: an online time of the supplier relating to the inquiry result and an active grade of the supplier relating to the inquiry result; and conducting a linear fitting of the one or more active level indicators to obtain the active level factor.

4. The method as recited in claim 1, wherein the collecting the information click conversion rate comprises:

obtaining a number of times the information being exposed and a number of times the information being clicked in a period of time according to statistics of information of a user log; and calculating a ratio of the number of times the information being exposed to the number of times the information being clicked as the information click conversion rate.

5. The method as recited in claim 1, wherein the collecting the feedback conversion rate of information comprises:

obtaining a number of times the information being clicked and a number of times the information with feedbacks in a period of time according to statistics of information of a user log; and calculating a ratio of the number of times the information with feedbacks to the number of times the information being clicked as the information feedback conversion rate.

6. An apparatus for sorting inquiry results in a search engine, comprising:

one or more processors; and memory having stored therein modules that are executable on the one or more processors, the modules including:

a first collection module that, based on extracted inquiry results matching search conditions of the user, collects one or more features of a respective inquiry result, the one or more features of the inquiry results including at least a quality factor indicating a quality of a respective inquiry result and one or in any combination of the following factors: an active level factor indicating an active level of a supplier relating to the respective inquiry result, an industry factor indicating an industry of the supplier relating to the respective inquiry result, an information click conversion rate and an information feedback conversion rate of the supplier relating to the respective inquiry result, the collecting the quality factor including:

obtaining one or more quality indicators of the respective inquiry result according to statistics of information of a database, the one or more quality indicators including one or any combination of: a completion rate of information including a ratio of a number of filled fields to a number of fillable fields of the respective inquiry result, a completion rate of attributes including a ratio of a number of filled attributes to a number of fillable attributes of the respective inquiry result, and a completion rate of detailed description including a pre-set value based on a number of words included in a description of the respective inquiry result; and conducting a linear fitting of the one or more quality indicators to obtain the quality factor;

a feature fitting module that uses the collected factors as one or more features of the respective inquiry result and conducts feature fitting based on a support vector machine (SVM) regression model to obtain a feature fitting value of the respective inquiry result; and a sorting module that sorts the inquiry results based on relevancy values of the inquiry results, and, for inquiry results having a same or similar relevancy values, sorting the inquiry results in a top-down manner based on feature fitting values of the inquiry results.

7. The apparatus as recited in claim 6, further comprising a second collection module that collects a timeliness factor indicating a timeliness of the respective inquiry result.

8. One or more computer-readable storage media comprising computer-readable instructions executable by one or more processors that, when executed by the one or more processors, cause the one or more processors to perform operations comprising:

collecting one or more features of a respective inquiry result of inquiry results matching a search condition of a user, the one or more features of the inquiry results including at least a quality factor indicating quality of the respective inquiry result and one or any combination of the following factors: an active level factor indicating an active level of a supplier relating to the respective inquiry result, an industry factor indicating an industry of the supplier relating to the respective inquiry result, an information click conversion rate and an information feedback conversion rate of the supplier relating to the respective inquiry result, the collecting the quality factor including:

obtaining one or more quality indicators of the respective inquiry result according to statistics of information of a database, the one or more quality indicators including one or any combination of: a completion rate of information including a ratio of a number of filled fields to a number of fillable fields of the respective inquiry result, a completion rate of attributes including a ratio of a number of filled attributes to a number of fillable attributes of the respective inquiry result, and a completion rate of detailed description including a pre-set value based on a number of words included in a description of the respective inquiry result; and conducting a linear fitting of the one or more quality indicators to obtain the quality factor using collected factors as the one or more features of the respective inquiry result and conducting feature fitting based on a support vector machine (SVM) regression model to obtain a feature fitting value of the respective inquiry result; and sorting the inquiry results based on relevancy values of the inquiry results, and, for inquiry results having a same or similar relevancy values, sorting the inquiry results in a top-down manner based on feature fitting values of the inquiry results.

9. The one or more computer-readable media as recited in claim 8, wherein the similar relevancy values are values whose differences are within a threshold.

10. The one or more computer-readable media as recited in claim 8, wherein the one or more active level factors comprise an online time of the supplier and an active grade of the supplier.

11. The one or more computer-readable media as recited in claim 8, wherein the industry factor indicates the industry of the supplier relating to the respective inquiry result according to user log information.

12. The one or more computer-readable media as recited in claim 8, wherein the information click conversion rate is obtained by calculating a ratio of a number of times information is exposed to a number of times the information is clicked.

13. The one or more computer-readable media as recited in claim 8, wherein the one or more features further comprise a click feedback rate obtained by calculating a ratio of a number of times feedback is received to a number of times information is clicked.

14. The one or more computer-readable media as recited in claim 8, wherein the one or more features further comprise a timeliness factor indicating a timeliness of the respective inquiry result.

15. The method as recited in claim 1, wherein the one or more features further comprise a click feedback rate obtained by calculating a ratio of a number of times feedback is received to a number of times information is clicked.

16. The apparatus as recited in claim 6, wherein the one or more features further comprise a click feedback rate obtained by calculating a ratio of a number of times feedback is received to a number of times information is clicked.

17. The apparatus as recited in claim 6, wherein the first collection module collects the active level factor by:

obtaining one or more active level indicators of the supplier relating to the respective inquiry result, the one or more active level indicators including one or any combination of: an online time of the supplier relating to the inquiry result and an active grade of the supplier relating to the inquiry result; and conducting a linear fitting of the one or more active level indicators to obtain the active level factor.

18. The one or more computer-readable media as recited in claim 8, wherein the collecting the active level factor comprises:

obtaining one or more active level indicators of the supplier relating to the respective inquiry result, the one or more active level indicators including one or any combination of: an online time of the supplier relating to the inquiry result and an active grade of the supplier relating to the inquiry result; and conducting a linear fitting of the one or more active level indicators to obtain the active level factor.

19. The one or more computer-readable media as recited in claim 8, wherein the collecting the information click conversion rate comprises:

obtaining a number of times the information being exposed and a number of times the information being clicked in a period of time according to statistics of information of a user log; and calculating a ratio of the number of times the information being exposed to the number of times the information being clicked as the information click conversion rate.

20. The one or more computer-readable media as recited in claim 8, wherein the collecting the feedback conversion rate of information comprises:

obtaining a number of times the information being clicked and a number of times the information with feedbacks in a period of time according to statistics of information of a user log; and calculating a ratio of the number of times the information with feedbacks to the number of times the information being clicked as the information feedback conversion rate.

* * * * *